(12) United States Patent
Adelman et al.

(10) Patent No.: US 8,751,586 B2
(45) Date of Patent: Jun. 10, 2014

(54) DOMAIN NAME CONTROL BASED SOCIAL WEBSITE ACCOUNT AUTHENTICATION

(75) Inventors: Warren Adelman, Scottsdale, AZ (US); Justin Jilg, Mesa, AZ (US); Yong Lee, Chandler, AZ (US)

(73) Assignee: Go Daddy Operating Company, LLC, Scottsdale, AZ (US)

(*) Notice: Subject to any disclaimer, the term of this patent is extended or adjusted under 35 U.S.C. 154(b) by 591 days.

(21) Appl. No.: 12/549,676

(22) Filed: Aug. 28, 2009

(65) Prior Publication Data
US 2011/0055331 A1 Mar. 3, 2011

(51) Int. Cl.
*G06F 15/16* (2006.01)

(52) U.S. Cl.
USPC ............ 709/206; 709/217; 709/219; 709/229

(58) Field of Classification Search
USPC .......................................... 709/206, 219, 229
See application file for complete search history.

(56) References Cited

U.S. PATENT DOCUMENTS

| | | | |
|---|---|---|---|
| 7,120,929 B2 | 10/2006 | Beattie et al. | |
| 7,493,403 B2* | 2/2009 | Shull et al. | 709/229 |
| 7,562,212 B2 | 7/2009 | Beattie et al. | |
| 7,761,583 B2* | 7/2010 | Shull et al. | 709/229 |
| 8,065,300 B2* | 11/2011 | Gupta et al. | 707/730 |
| 8,646,071 B2* | 2/2014 | Pereira et al. | 726/22 |
| 2002/0129013 A1 | 9/2002 | Thomas | |
| 2003/0126431 A1* | 7/2003 | Beattie et al. | 713/156 |
| 2003/0200205 A1 | 10/2003 | Meiresonne | |
| 2004/0199608 A1* | 10/2004 | Rechterman et al. | 709/220 |
| 2005/0060263 A1* | 3/2005 | Golan et al. | 705/44 |
| 2005/0125319 A1 | 6/2005 | Johnson | |
| 2005/0166262 A1 | 7/2005 | Beattie et al. | |
| 2006/0047725 A1* | 3/2006 | Bramson | 707/204 |
| 2007/0067465 A1* | 3/2007 | Blinn et al. | 709/229 |
| 2007/0106612 A1* | 5/2007 | O'Brien et al. | 705/44 |
| 2007/0162458 A1* | 7/2007 | Fasciano | 707/10 |
| 2007/0179863 A1* | 8/2007 | Stoll | 705/26 |
| 2007/0192493 A1* | 8/2007 | Manolache et al. | 709/226 |
| 2007/0208869 A1* | 9/2007 | Adelman et al. | 709/229 |
| 2008/0005312 A1* | 1/2008 | Boss et al. | 709/224 |
| 2008/0133735 A1* | 6/2008 | Thayer et al. | 709/223 |
| 2008/0229430 A1* | 9/2008 | Kargman | 726/28 |
| 2009/0210444 A1 | 8/2009 | Bailey et al. | |
| 2009/0228702 A1* | 9/2009 | Rosenberg et al. | 713/155 |
| 2009/0248595 A1* | 10/2009 | Lu et al. | 706/12 |
| 2010/0100406 A1* | 4/2010 | Lim | 705/7 |
| 2010/0125675 A1 | 5/2010 | Richardson et al. | |
| 2010/0250676 A1* | 9/2010 | Ufford et al. | 709/204 |

(Continued)

OTHER PUBLICATIONS

Purcell, Kevin, "You Can Use Gmail for Your Domain", Mar. 2009, pp. 26-31.*

(Continued)

*Primary Examiner* — David Lazaro
*Assistant Examiner* — Sarah Drabik
(74) *Attorney, Agent, or Firm* — Karl A. Fazio

(57) ABSTRACT

Methods of the present inventions allow for verifying the authenticity of social website accounts. An example embodiment of a domain name control based social website account authentication method may comprise the steps of receiving a request (that may include a business name and a business email address) to verify the authenticity of a social website account, determining whether the domain name used by the business email address is registered to and under control of the business, and—if so—certifying the authenticity of the social website account.

37 Claims, 14 Drawing Sheets

(56) References Cited

U.S. PATENT DOCUMENTS

| | | | | |
|---|---|---|---|---|
| 2010/0268932 | A1* | 10/2010 | Bhattacharjee | 713/151 |
| 2011/0010305 | A1* | 1/2011 | Aleong et al. | 705/319 |
| 2011/0055249 | A1* | 3/2011 | Consuegra et al. | 707/769 |

OTHER PUBLICATIONS

Purcell, Kevin, "You Can Use Gmail for Your Domain", <http://www.ccmag.com/2009_03/ccmag2009_03kpurcell.pdf>, Mar. 2009, pp. 26-31.*
Parr, Ben, "Twitter to Launch Verified Accounts", Jun. 6, 2009, retrieved from <http://mashable.com/2009/06/06/twitter-verified-accounts/>.*
Oct. 28, 2011 office action in related U.S. Appl. No. 12/549,686.
Jan. 26, 2012 response to Oct. 28, 2011 office action in related U.S. Appl. No. 12/549,686.
Nov. 7, 2011 office action in related U.S. Appl. No. 12/549,703.
Feb. 1, 2012 response to Nov. 7, 2011 office action in related U.S. Appl. No. 12/549,703.
Apr. 28, 2011 office action in related U.S. Appl. No. 12/566,919.
Jul. 13, 2011 response to Apr. 28, 2011 office action in related U.S. Appl. No. 12/566,919.
Sep. 30, 2011 office action in related U.S. Appl. No. 12/566,919.
Dec. 7, 2011 response to Sep. 30, 2011 office action in related U.S. Appl. No. 12/566,919.
Sep. 16, 2011 office action in related U.S. Appl. No. 12/566,934.
Dec. 7, 2011 response to Sep. 16, 2011 office action in related U.S. Appl. No. 12/566,934.
Kevin A. Purcell, "You Can Use Gmail for Your Domain", Mar. 2009, Christian Computing Magazine.
Sep. 28, 2012 response to Aug. 28, 2012 Office Action in related U.S. Appl. No. 12/549,686.
Sep. 21, 2012 response to Aug. 28, 2012 Office Action in related U.S. Appl. No. 12/549,703.
Jun. 1, 2012 response to Mar. 13, 2012 Office Action in related U.S. Appl. No. 12/549,686.
Jun. 1, 2012 response to Mar. 19, 2012 Office Action in related U.S. Appl. No. 12/549,703.
Jun. 22, 2012 office action in related U.S. Appl. No. 12/549,703.
Jul. 3, 2012 office action in related U.S. Appl. No. 12/549,686.
Jul. 13, 2012 Appeal Brief in related U.S. Appl. No. 12/566,934.
Aug. 20, 2012 office action in related U.S. Appl. No. 12/566,919.
Feb. 14, 2013 Office Action in related U.S. Appl. No. 12/549,686.
Jan. 10, 2013 response to Oct. 16, 2012 Office Action in related U.S. Appl. No. 12/549,703.
Feb. 4, 2014 Office Action in related U.S. Appl. No. 12/566,934.
Apr. 19, 2013 Reply Brief in related U.S. Appl. No. 12/566,919.
Jan. 31, 2013 Office Action in related U.S. Appl. No. 12/549,703.
Feb. 4, 2013 response to Nov. 5, 2012 Office Action in related U.S. Appl. No. 12/566,934.
Apr. 24, 2013 response to Jan. 31, 2013 Office Action in related U.S. Appl. No. 12/549,703.
Jul. 19, 2013 Office Action in related U.S. Appl. No. 12/549,703.

* cited by examiner

DOMAIN NAME CONTROL BASED SOCIAL WEBSITE ACCOUNT AUTHENTICATION

CROSS REFERENCE TO RELATED PATENT APPLICATIONS

This patent application is related to U.S. patent application Ser. No. 12/549,686 entitled: "Public Key Certificate Based Social Website Account Authentication" concurrently filed herewith and also assigned to Go Daddy Operating Company, LLC.

This patent application is related to U.S. patent application Ser. No. 12/549,703 entitled: "Business Validation Based Social Website Account Authentication" concurrently filed herewith and also assigned to Go Daddy Operating Company, LLC.

FIELD OF THE INVENTION

The present inventions generally relate to social networking websites and, more particularly, methods for verifying the authenticity of a social website account.

SUMMARY OF THE INVENTION

An example embodiment of a domain name control based social website account authentication method may comprise the steps of receiving a request (that may include a business name and a business email address) to verify the authenticity of a social website account, determining whether the domain name used by the business email address is registered to and under control of the business, and—if so—certifying the authenticity of the social website account.

An example embodiment of a public key certificate based social website account authentication method may comprise the steps of receiving a request (that may include a business name and a business email address) to verify the authenticity of a social website account and determining whether a public key certificate has been issued for the domain name used by the business email address. If a public key certificate has been issued, the method may further comprise determining whether the public key certificate identifies the business name and domain name provided in the original request. If so, the method may further comprise determining whether the business email address is under the control of the business and, if so, certifying the authenticity of the social website account.

An example embodiment of a business validation based social website account authentication method may comprise the steps of receiving a request (that may include a business name and a business email address) to verify the authenticity of a social website account, validating the business and business email address, and determining whether the domain name is registered to and under control of the business. If the business and business email address are both validated, and the domain name is registered to and under control of the business, the social website account's authenticity may be certified.

The features and advantages of the present inventions will be better understood from the following detailed description taken in conjunction with the accompanying drawings.

DETAILED DESCRIPTION

Figure 1:
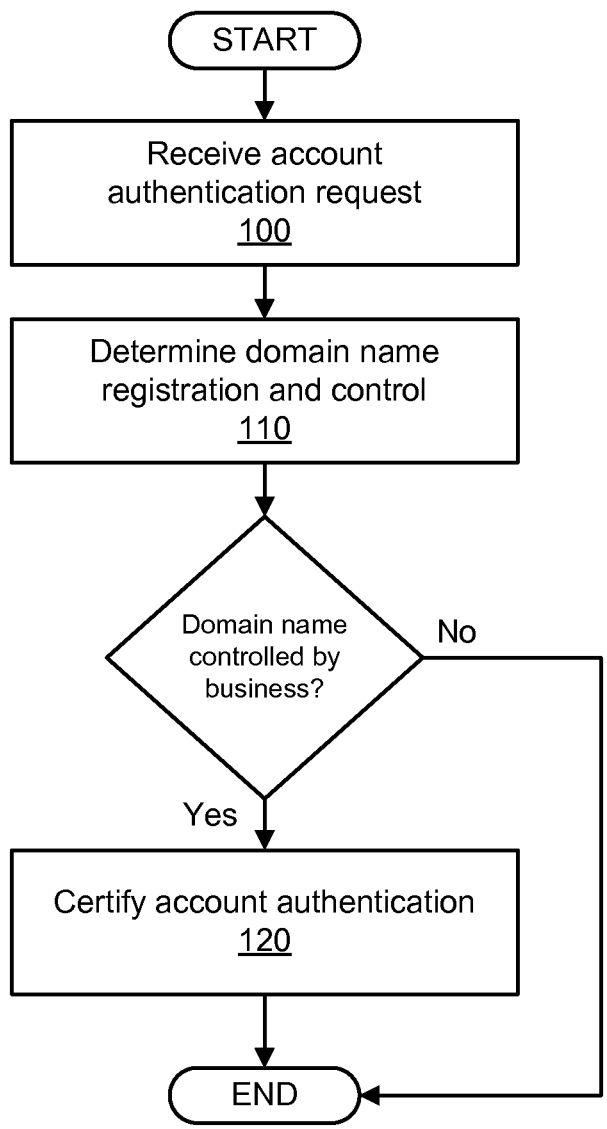
FIG. 1 is a flow diagram illustrating a possible embodiment of a domain name control based social website account authentication method.

The present inventions will now be discussed in detail with regard to the attached drawing figures which were briefly described above. In the following description, numerous specific details are set forth illustrating the Applicant's best mode for practicing the inventions and enabling one of ordinary skill in the art to make and use the inventions. It will be obvious, however, to one skilled in the art that the present inventions may be practiced without many of these specific details. In other instances, well-known machines, structures, and method steps have not been described in particular detail in order to avoid unnecessarily obscuring the present inventions. Unless otherwise indicated, like parts and method steps are referred to with like reference numerals.

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers place multimedia information (e.g., text, graphics, audio, video, animation, and other forms of data) at specific locations on the Internet referred to as webpages. Websites comprise a collection of connected, or otherwise related, webpages. The combination of all the websites and their corresponding webpages on the Internet is generally known as the World Wide Web (WWW) or simply the Web.

For Internet users and businesses alike, the Internet continues to be increasingly valuable. More people use the Web for everyday tasks, from social networking, shopping, banking, and paying bills to consuming media and entertainment. E-commerce is growing, with businesses delivering more services and content across the Internet, communicating and collaborating online, and inventing new ways to connect with each other.

Prevalent on the Web are multimedia websites, some of which may offer and sell goods and services to individuals and organizations. Websites may consist of a single webpage, but typically consist of multiple interconnected and related webpages. Websites, unless extremely large and complex or have unusual traffic demands, typically reside on a single server and are prepared and maintained by a single individual or entity. Menus and links may be used to move between different webpages within the website or to move to a different website as is known in the art. The interconnectivity of webpages enabled by the Internet can make it difficult for Internet users to tell where one website ends and another begins.

Websites may be created using HyperText Markup Language (HTML) to generate a standard set of tags that define how the webpages for the website are to be displayed. Users of the Internet may access content providers' websites using software known as an Internet browser, such as MICROSOFT INTERNET EXPLORER or MOZILLA FIREFOX. After the browser has located the desired webpage, it requests and receives information from the webpage, typically in the form of an HTML document, and then displays the webpage content for the user. The user then may view other webpages at the same website or move to an entirely different website using the browser.

Some Internet users, typically those that are larger and more sophisticated, may provide their own hardware, software, and connections to the Internet. But many Internet users either do not have the resources available or do not want to create and maintain the infrastructure necessary to host their own websites. To assist such individuals (or entities), hosting companies exist that offer website hosting services. These hosting providers typically provide the hardware, software, and electronic communication means necessary to connect multiple websites to the Internet. A single hosting provider may literally host thousands of websites on one or more hosting servers.

Browsers are able to locate specific websites because each website, resource, and computer on the Internet has a unique Internet Protocol (IP) address. Presently, there are two standards for IP addresses. The older IP address standard, often called IP Version 4 (IPv4), is a 32-bit binary number, which is typically shown in dotted decimal notation, where four 8-bit bytes are separated by a dot from each other (e.g., 64.202.167.32). The notation is used to improve human readability. The newer IP address standard, often called IP Version 6 (IPv6) or Next Generation Internet Protocol (IPng), is a 128-bit binary number. The standard human readable notation for IPv6 addresses presents the address as eight 16-bit hexadecimal words, each separated by a colon (e.g., 2EDC: BA98:0332:0000:CF8A:000C:2154:7313).

IP addresses, however, even in human readable notation, are difficult for people to remember and use. A Uniform Resource Locator (URL) is much easier to remember and may be used to point to any computer, directory, or file on the Internet. A browser is able to access a website on the Internet through the use of a URL. The URL may include a Hypertext Transfer Protocol (HTTP) request combined with the website's Internet address, also known as the website's domain name. An example of a URL with a HTTP request and domain name is: http://www.companyname.com. In this example, the "http" identifies the URL as a HTTP request and the "companyname.com" is the domain name.

Domain names are much easier to remember and use than their corresponding IP addresses. The Internet Corporation for Assigned Names and Numbers (ICANN) approves some Generic Top-Level Domains (gTLD) and delegates the responsibility to a particular organization (a "registry") for maintaining an authoritative source for the registered domain names within a TLD and their corresponding IP addresses. For certain TLDs (e.g., .biz, .info, .name, and .org) the registry is also the authoritative source for contact information related to the domain name and is referred to as a "thick" registry. For other TLDs (e.g., .com and .net) only the domain name, registrar identification, and name server information is stored within the registry, and a registrar is the authoritative source for the contact information related to the domain name. Such registries are referred to as "thin" registries. Most gTLDs are organized through a central domain name Shared Registration System (SRS) based on their TLD.

The process for registering a domain name with .com, .net, .org, and some other TLDs allows an Internet user to use an ICANN-accredited registrar to register their domain name. For example, if an Internet user, John Doe, wishes to register the domain name "mycompany.com," John Doe may initially determine whether the desired domain name is available by contacting a domain name registrar. The Internet user may make this contact using the registrar's webpage and typing the desired domain name into a field on the registrar's webpage created for this purpose. Upon receiving the request from the Internet user, the registrar may ascertain whether "mycompany.com" has already been registered by checking the SRS database associated with the TLD of the domain name. The results of the search then may be displayed on the webpage to thereby notify the Internet user of the availability of the domain name. If the domain name is available, the Internet user may proceed with the registration process. If the domain name is not available for registration, the Internet user may keep selecting alternative domain names until an available domain name is found.

Social websites may comprise Internet-based social networking services that focus on building online social networks for communities of people who may share interests and activities, wish to communicate with each other efficiently, and may be interested in exploring the interests and activities of others, and which necessitates the use of software applications. Most social websites are Internet based and provide a collection of various ways for users to interact, such as microblogging, blogging, chat, forums, instant messaging, email, video, voice chat, file sharing, discussion groups, etc. The main types of social networking services are those that contain directories of some categories (such as former classmates), means to connect and communicate with friends, and/or recommendation systems linked to trust. Popular social websites now combine many of these, with TWITTER, MYSPACE, FACEBOOK, YOUTUBE, LINKEDIN, and FLICKR being but a few examples.

Many social websites require their users to generate social website accounts to use the website. Among other purposes, the account may allow the social website to identify the user to other users online. The account generation process may include providing a variety of information that may be used to identify the user on the social website and/or generate a login/password combination for user authentication purposes. The information typically may be collected during a first-use registration process and may comprise requesting a broad array of information, perhaps ranging from no information to an email address to name, address, email address, and/or more specific information.

Generally, there is little or no verification of such user-provided information performed by the social website. Thus, an anonymous user may register as a famous person (or agent of a business or other organization) and participate on the social website as the famous person (or on behalf of the business or other organization). Applicant has therefore determined that presently-existing methods do not provide adequate means for verifying the authenticity of social website accounts. For these reasons, there is a need for the methods for authenticating social website accounts (and related functionality) as described herein.

Domain Name Control Based Social Website Account Authentication Methods

FIG. 1 illustrates a domain name control based social website account authentication method that may comprise the steps of receiving a request to verify the authenticity of a social website account (the request may include account registration information such as a business name and a business email address comprising a domain name) (Step 100) and determining whether the domain name is registered to (and/or under control of) the business (Step 110). If so, the authenticity of the social website account may be certified (Step 120).

A request to verify the authenticity of a social website account may be received (Step 100) from any individual or entity that may provide an account-based social website. A social website may comprise any software application that may focus on building and verifying online social networks for communities of people who may share interests and activities, wish to communicate with each other efficiently, and may be interested in exploring the interests and activities of others, and which necessitates the use of software applications. TWITTER, FACEBOOK, MYSPACE, and LINKEDIN are a few well-known examples of social websites.

The software application may comprise any client-side, server-side, or other software application that utilizes screen names to identify users. As non-limiting examples, the software application may comprise a blog application, micro-blogging application, chat application, forum application, social networking website application, instant messaging application and/or any combination thereof.

A blog (i.e., weblog) application may comprise a hosted website, perhaps maintained by an individual with regular entries of written commentary, or other material such as graphics or video, perhaps related to a particular topic. The ability for blog readers to comment on blog entries in an interactive format is common functionality implemented with many blogs. Both the blogger and readers may be identified in the commentary section by screen names that may be selected and registered, perhaps with the blog application.

A micro-blogging application may comprise a particular type of blogging application that allows users to send brief text (or perhaps small-file-size multimedia) updates to a website to be viewed by Internet users. The content of a micro-blog differs from a traditional blog in that it is typically smaller in actual size and aggregate file size. Such micro-blogs may be submitted by varying means, including website text entry or multimedia file uploads, text messaging, instant messaging, and/or email. As with blogs, micro-bloggers may subscribe to a micro-blogging service (e.g., TWITTER) that may require participants to register a screen name to participate. TWITTER for example, allows users to register screen names called "Twitter Handles" in the following format: @screenname. Continuing with the example from above, John Doe (who works at My Company) may register the screen name (i.e., Twitter Handle) "@johndoe," while official company micro-blogs may be posted under the screen name "@mycompany."

An instant messaging application may comprise an instant messaging software application that allows one user to communicate with another over a network in real time. The instant messaging software application may comprise proprietary or third-party (e.g., MICROSOFT OFFICE COMMUNICATOR, JABBER, GTALK, SKYPE, MEEBO, ICQ, YAHOO! MESSENGER, MSN MESSENGER, PIDGIN, and/or AOL INSTANT MESSENGER) systems. Many instant messaging software applications allow users to register a screen name and subsequently generate a contact list by adding other user's screen names to the list. If a user is online, their screen name may be displayed indicating that user may be available for instant messaging. Clicking on a user's name may activate an instant messaging window in which messages may be typed and responses received. User comments are generally identified by the user's screen name.

A chat application may comprise an electronic discussion group software application (i.e., text chat) that allows users to join chat rooms and publicly communicate with many users at the same time. Example chat protocols that may be utilized include, as non-limiting examples, Internet Relay Chat (IRC) and/or eXtensible Messaging and Presence Protocol (XMPP). In many discussion group applications, users may join a pre-existing chat room or create a chat room about any topic. Once in the chat room, users may type messages that other users in the room can read, as well as respond to messages from others. Such Chat applications generally require users to register a screen name to participate. User comments are generally identified by the user's screen name.

A forum application may comprise an online group discussion website application for displaying and managing user-generated content, perhaps relating to a particular topic (or topics). The forum application may allow users to post comments (perhaps in text or multimedia format) regarding the topic(s) and may require Internet users to become members (i.e., register with the application) before being allowed to submit messages ("posts"). The registration process typically comprises age verification and agreement to the forum application's terms of service. Registered members may be assigned (or select) a screen name that may be displayed with the user's submitted post. Forum applications may be available for implementation on a website via the Internet and may be written in a variety of programming languages, such as PHP, Perl, Java, and/or ASP.

The term "social website account" is meant to be broadly construed to include any established relationship between a user and a website, computer, network, and/or other information service. Social websites may use such social website accounts to identify a user, perhaps by a screen name, which may comprise an alphanumeric, ASCII, or other sequence of characters, images, and/or file types used by a software application to identify a user to other users, such as on a social website. To log in to a social website account, the user may be required to authenticate himself with a password (possible his screen name) or other credentials for the purposes of accounting, security, logging, and resource management.

The request to verify a social website account may comprise any communication seeking verification of a social website account's authentication including, but not limited to, an electronic request received by the server computer including, but not limited to, a Hyper Text Transfer Protocol (HTTP) request, email message, Short Message Service (SMS) message (i.e., text message), and/or function call on an Applications Programming Interface (API). The request may include any information about the social website account that may be useful to the process of verifying the account's authenticity.

As a non-limiting example, the request may include information received from a user by the social website during a registration or account generation process. Such information may include the user's name, address, phone number, domain name, and/or email address. If the user is a business or business employee, the information may include the business name, business email address, business phone number, business domain name, and/or employee names. Alternatively, the request may comprise information that was not provided by the user. As a non-limiting example, such information may comprise information about the user obtained by or in the possession of the social website from other sources, such as publically-available information.

The illustrated embodiments place no limitation on the format the domain name may take. While future iterations of the DNS may establish alternate domain name formats (perhaps using different alphanumeric structures or file types such as image, audio, or video files functioning as a domain name or a similarly-functioning resource locator), which are explicitly contemplated by this patent application, the traditional domain name structure comprises a root name (i.e., "mycompany" in the domain name mycompany.com) concatenated to a top-level domain (i.e., ".com" in the domain name mycompany.com). In this construct, an email address may comprise a username concatenated to a domain name (e.g., user@mycompany.com). Software and/or scripts, perhaps running on the at least one server, may parse the domain name from any provided email to perform subsequent steps.

Figure 2:
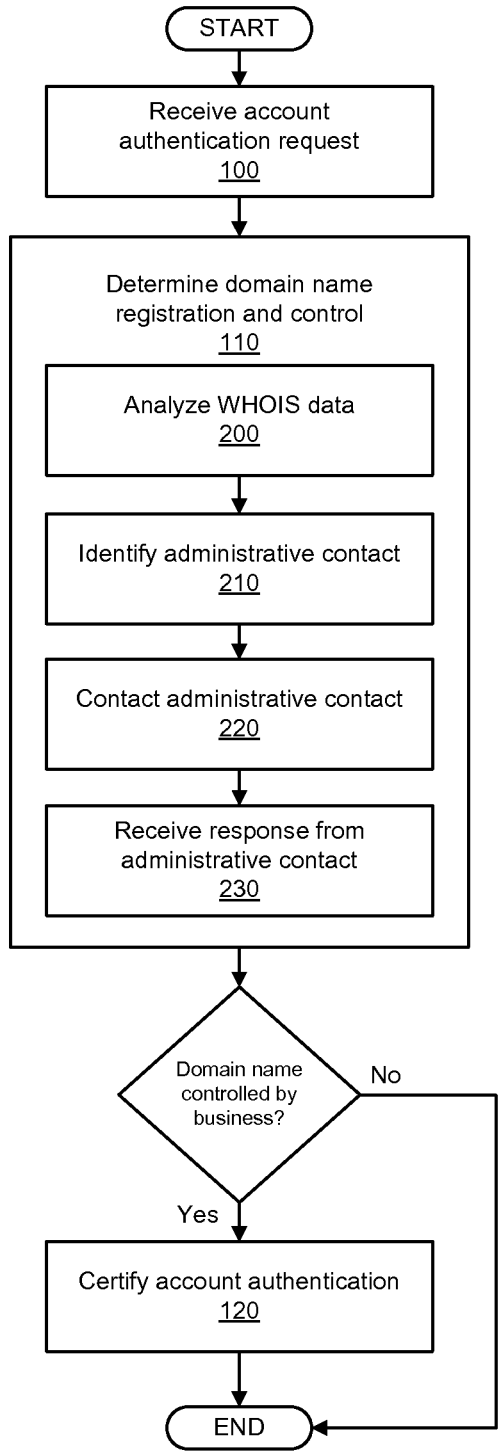
FIG. 2 is a flow diagram illustrating a possible embodiment of a domain name control based social website account authentication method.

Whether the domain name is registered to and/or under control of the provided business name then may be determined (Step 110). This step may be accomplished by any method of verifying domain name registration and/or control known in the art or developed in the future. As a non-limiting example (and as illustrated in FIG. 2), Step 110 may be accomplished by analyzing a WHOIS data for the domain name (Step 200), identifying an administrative contact from the WHOIS data (Step 210), contacting the administrative contact (Step 220), and receiving a response from the administrative contact confirming that the domain name is registered to and under control of the business (Step 230).

The WHOIS system is a TCP-based (Transmission Control Protocol) transaction-oriented query/response protocol and system that is used to provide information services to Internet users. It is widely used for querying databases in order to determine the registrant, administrative contact, technical contact, or other information regarding a domain name. While originally used to provide "white pages" services and information about registered domain names, current deployments cover a much broader range of information services. The protocol delivers its content (WHOIS data) in a human-readable format. WHOIS data may be obtained by transmitting a request to a WHOIS server listening on a TCP port for requests from WHOIS clients. The WHOIS client may make a text request to the WHOIS server, which may reply in kind with text content. The WHOIS server may close its connection as soon as the output is finished. The closed TCP connection is the indication to the client that the response has been received. Once received, the domain name's WHOIS data may be analyzed (Step 200) and the administrative contact for the domain name may be identified (Step 210).

Figure 3:
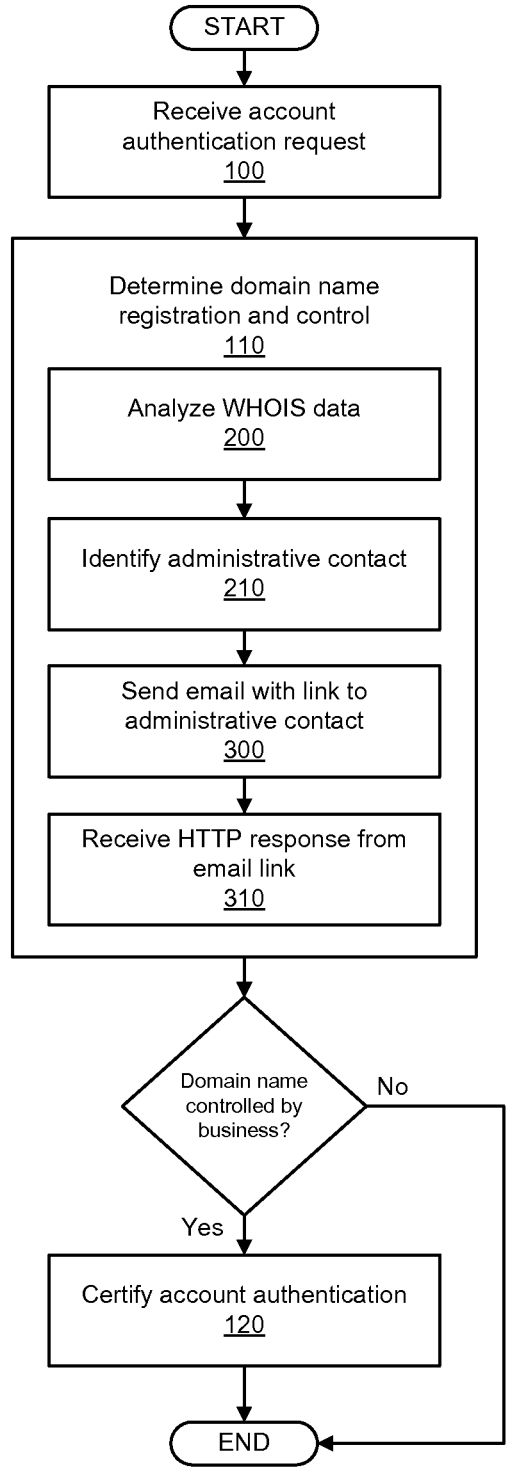
FIG. 3 is a flow diagram illustrating a possible embodiment of a domain name control based social website account authentication method.

The domain name's administrative contact may then be contacted (Step 220) to ascertain whether the domain name is registered to and/or under control of the subject business. The administrative contact may be communicated with via any method or means of communication known in the art or developed in the future including, but not limited to direct, person-to-person, written, telephonic, and/or electronic communications means. As a non-limiting example, where the WHOIS data comprises an administrative contact email address, the administrative contact may be contacted by sending an email message, perhaps containing a hyperlink that, when received and clicked, may transmit a response, which will indicate email account control. Thus, as illustrated in FIG. 3, the step of contacting the domain name's administrative contact (Step 220) may be accomplished by sending an email message, perhaps containing a hyperlink, to the administrative contact's email address (Step 300) and receiving an HTTP request that may originate from the hyperlink (Step 310).

Figure 4:
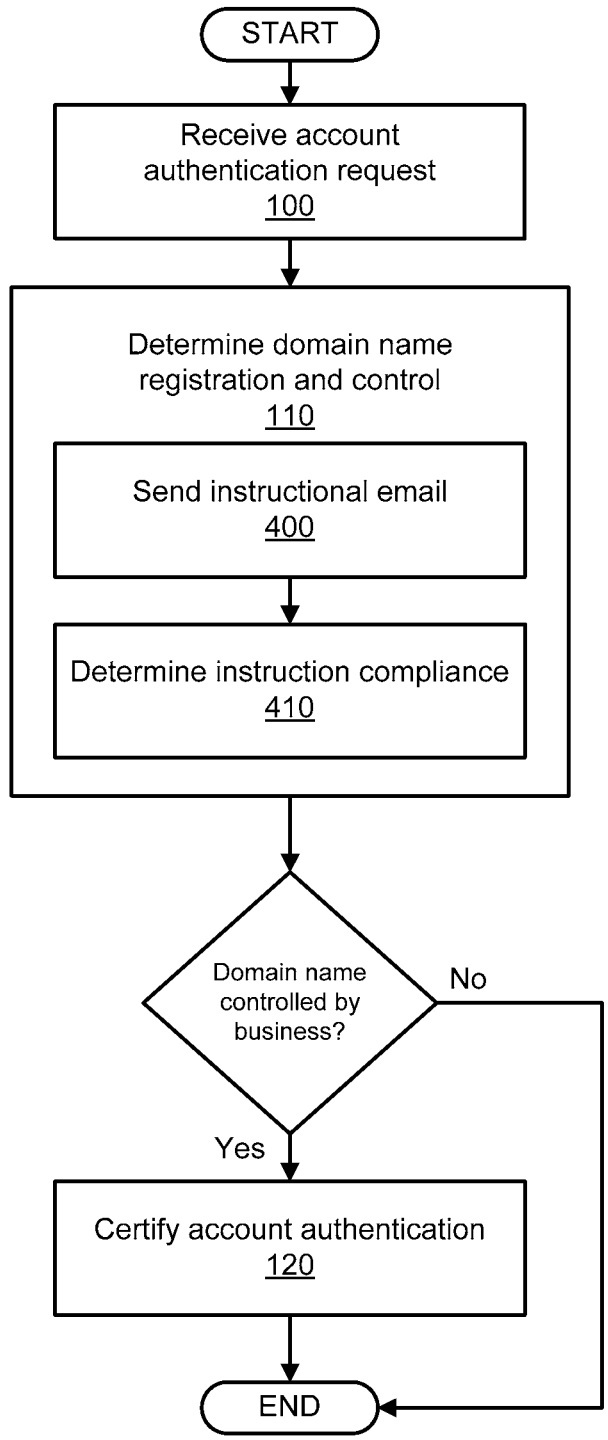
FIG. 4 is a flow diagram illustrating a possible embodiment of a domain name control based social website account authentication method.

Alternatively, and as illustrated in FIG. 4, domain name registration and/or control may be determined (Step 110) by sending an email message (or other communication as described above) to the business email address provided in the original request, wherein the email message comprises at least one instruction for verifying that the domain name is registered to and under control of said business name (Step 400). The email message may comprise any instruction or instructions that, if complied with, demonstrate domain name registration and/or control.

As a non-limiting example, the email message (or other communication as described above) may comprise at least one instruction to modify a CNAME record for the domain name. A CNAME record is a type of resource record in the DNS system that specifies whether the domain name is an alias of another domain name. Only an individual or entity having control over the domain name may modify the CNAME record. By determining whether the CNAME record was modified according to the email's instructions (perhaps by analyzing the domain name's DNS record), domain name registration and/or control may be determined (Step 110).

As another non-limiting example, the email message (or other communication as described above) may comprise at least one instruction to upload an HTML file (and/or any other file type that may be uploaded to—and detected on—a webpage) to a webpage resolving from the domain name. The email message may contain the HTML file itself, a hyperlink to the HTML file, or simply a file name for an HTML file. Once the HTML file has been uploaded, an Internet user may detect the file on the webpage (perhaps by accessing the webpage via a browser). If the file is detected, domain name registration and/or control has been demonstrated (Step 110).

Returning to FIG. 1, the illustrated process may conclude by (responsive to a determination that the domain name is registered to and under control of the business) certifying the authenticity of the social website account (Step 120). This step may be accomplished by any method known in the art or developed in the future of informing the social website that the social website account is authentic. As a non-limiting example, the certification (Step 120) may be accomplished by notifying the social website that the domain name is registered to and under control of the business. Such notification may be communicated via any method or means of communication known in the art or developed in the future including, but not limited to any electronic response received (perhaps at a server computer responsive to a request sent in kind) including, but not limited to, a Hyper Text Transfer Protocol (HTTP) request, email message, and/or Short Message Service (SMS) message (i.e., text message). Notification also may be received via paper mail, telephone conversation, person to person contact, or any other means for receiving screen name availability notice known in the art or developed in the future.

As a non-limiting example, such notification may be accomplished by transmitting a certification seal to the social website. The certification seal may indicate to social website users that the social website account they may be accessing has been validated. It may be in the form of a displayable image, perhaps a digital certificate for display on a webpage. The certification seal also may take the form of a change in appearance of the social website (or the URL bar in a browser) when it appears on a computer screen. It also could comprise an audible sound, such as an audio file that plays when the social website account is accessed (e.g., chimes).

Methods for providing a certification seal to a social website include, but are not limited to: (1) sending a piece of software to the social website (or other individual or entity) for installation on a hosting computer, server, website, database, or other storage device; (2) storing the certification seal on a computer, server, website, database, or other storage device from which the social website may retrieve the certification seal; or (3) sending the certification seal to a third party for storage on a computer, server, website, database, or other storage device from which the social website (or other individual or entity) may retrieve the certification seal.

Alternatively, the social website may be notified that the domain name is registered to and under control of the business by validating said social website account via the social website's Applications Programming Interface (API). An API is a software-to-software interface that specifies the protocol defining how independent computer programs interact or communicate with each other. The API may allow a requesting party's software to communicate and interact with the software application and/or its provider—perhaps over the network—through a series of function calls (requests for services). It may comprise an interface provided by the social website and/or its provider to support function calls made of the social website by other computer programs, perhaps those utilized by the requesting party to determine screen name availability. The API may comprise any API type known in the art or developed in the future including, but not limited to, request-style, Berkeley Sockets, Transport Layer Interface (TLI), Representational State Transfer (REST), SOAP, Remote Procedure Calls (RPC), Standard Query Language (SQL), file transfer, message delivery, and/or any combination thereof.

Figure 5:
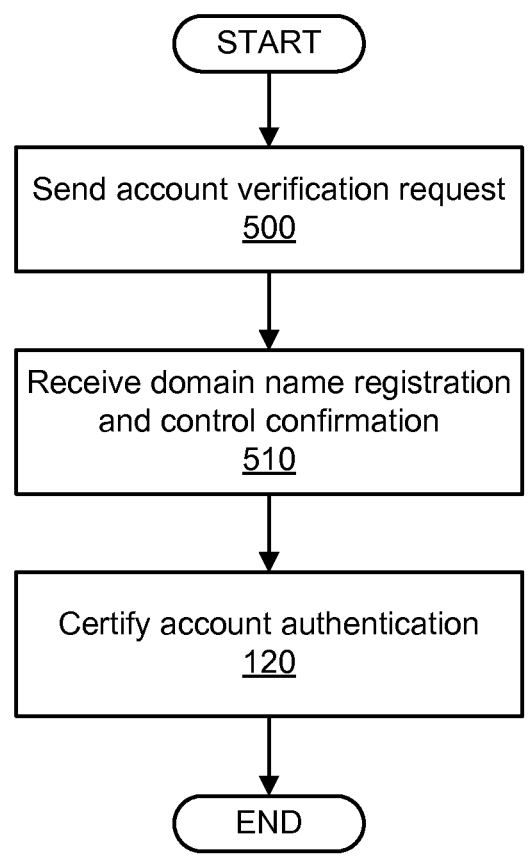
FIG. 5 is a flow diagram illustrating a possible embodiment of a domain name control based social website account authentication method.

FIG. 5 illustrates another embodiment of a domain name control based social website account authentication method. The illustrated method may comprise the step of sending (perhaps by at least one server computer communicatively coupled to a network) a request to verify the authenticity of a social website account (the request may include account registration information such as a business name and a business email address comprising a domain name) (Step 500). The request may come from any individual or entity offering, hosting, or otherwise providing a social website that utilizes social website accounts, which may need authenticity verification. The request may comprise any electronic request received by a server computer including, but not limited to, a Hyper Text Transfer Protocol (HTTP) request, email message, and/or Short Message Service (SMS) message (i.e., text message). The request may comprise any combination of data seeking to verify the authenticity of a social website account.

As a non-limiting example, the request may include information received from a user by the social website during a registration or account generation process. Such information may include the user's name, address, phone number, domain name, and/or email address. If the user is a business or business employee, the information may include the business name, business email address, business phone number, business domain name, and/or employee names. Alternatively, the request may comprise information that was not provided by the user. As a non-limiting example, such information may comprise information about the user obtained by or in the possession of the social website from other sources, such as publically-available information.

Figure 6:
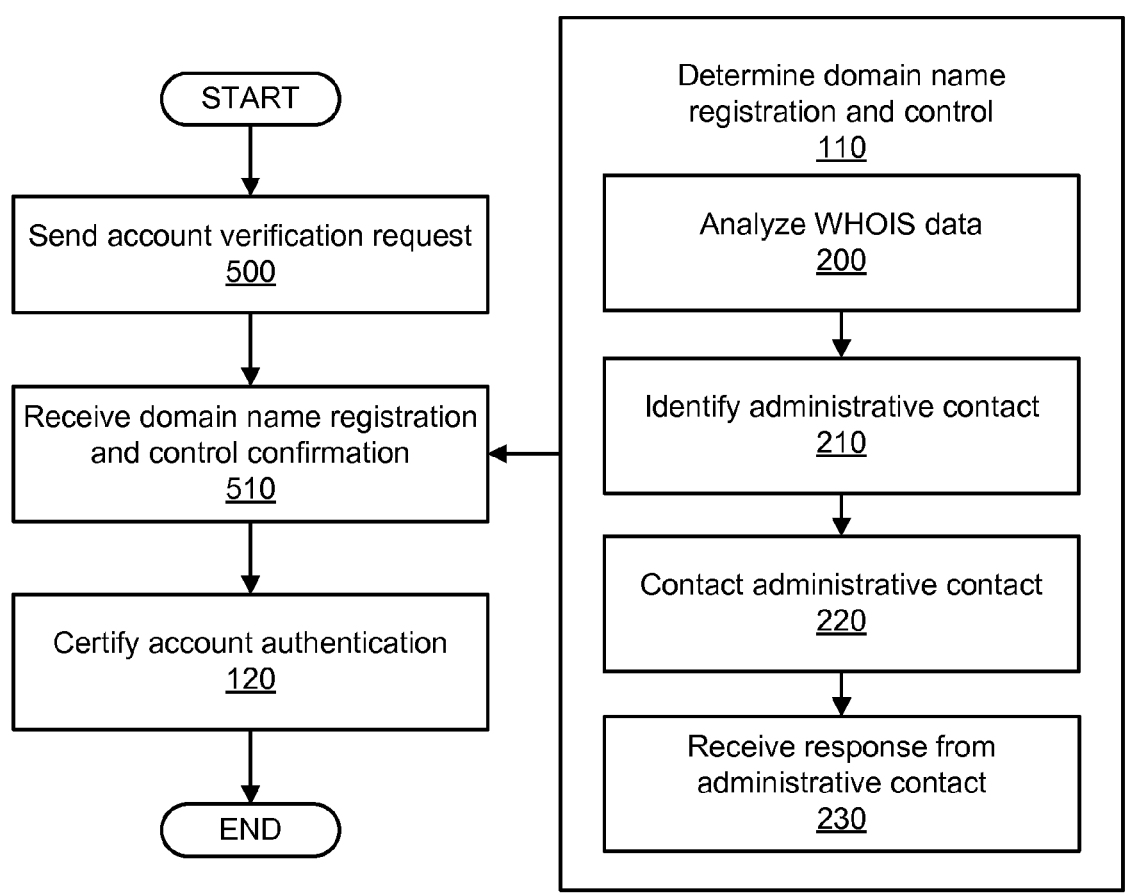
FIG. 6 is a flow diagram illustrating a possible embodiment of a domain name control based social website account authentication method.
Figure 7:
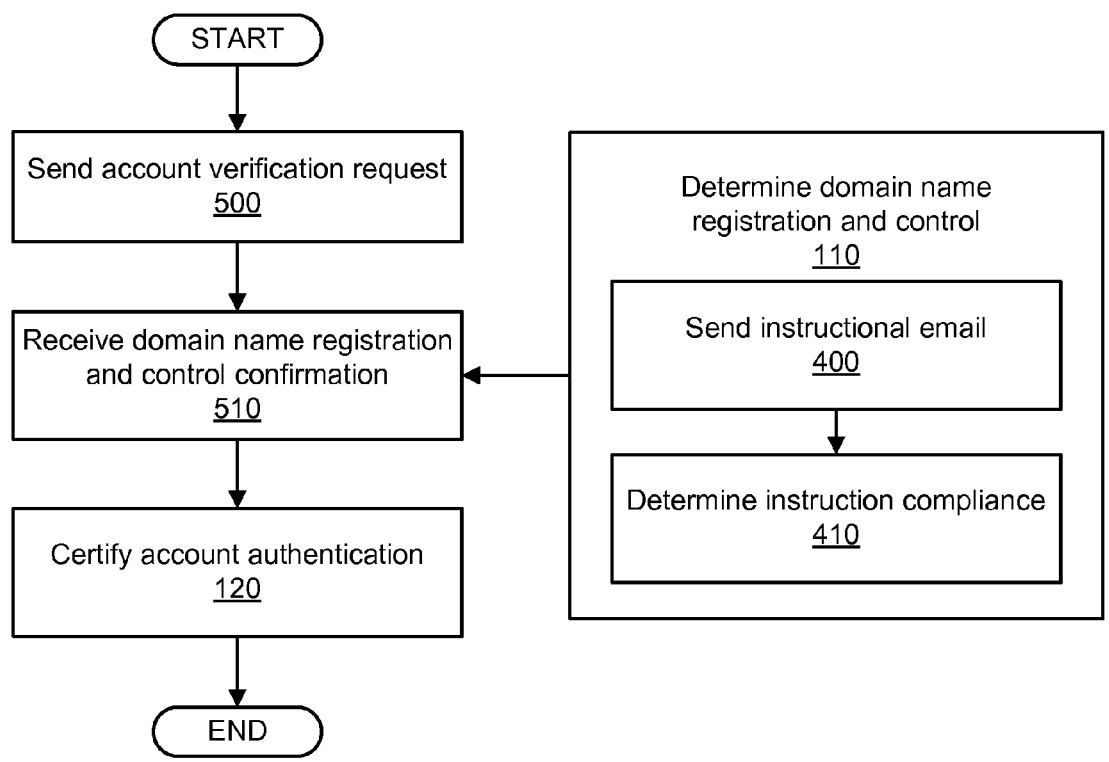
FIG. 7 is a flow diagram illustrating a possible embodiment of a domain name control based social website account authentication method.

Subsequent to transmitting the request (Step 500), confirmation that the domain name is registered to and under control of the business name provided in the request may be received (Step 510). As a non-limiting example, and as illustrated in FIGS. 4, 6-7, the received confirmation may be obtained by any of the methods for determining domain name registration and control described above with respect to Steps 110, 200-230, 300, 310, 400, and 410. The illustrated process may conclude by certifying the authenticity of the social website account as described in detail above with respect to Step 120.

Public Key Certificate Based Social Website Account Authentication Methods

Figure 8:
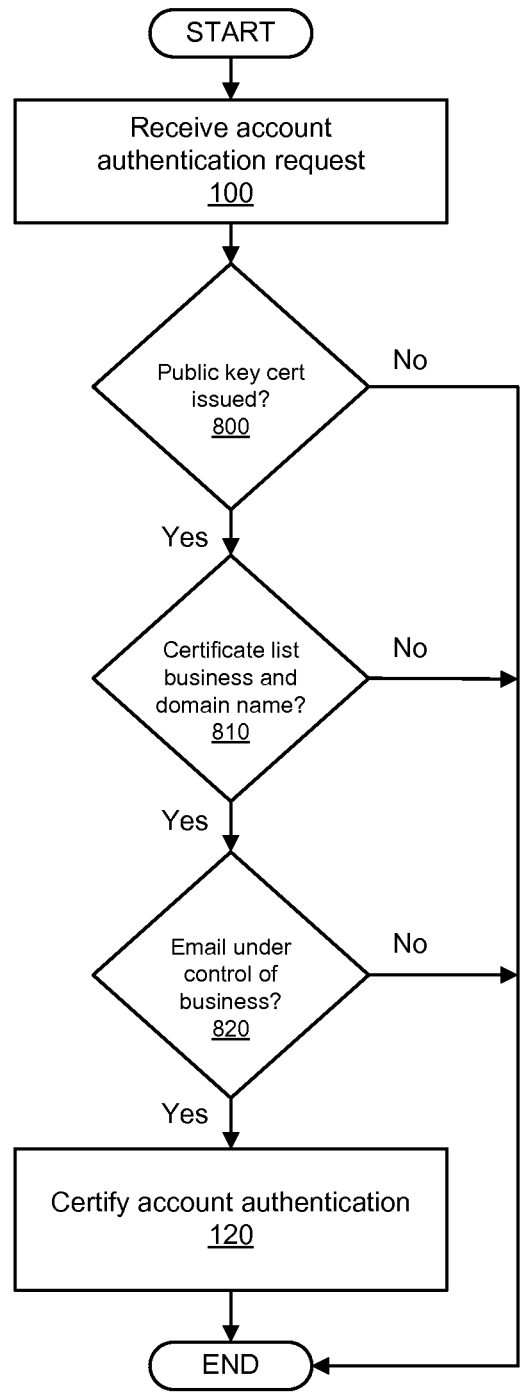
FIG. 8 is a flow diagram illustrating a possible embodiment of a public key certificate based social website account authentication method.

FIG. 8 illustrates a public key certificate based social website account authentication method that may comprise the step of receiving a request to verify the authenticity of a social website account (the request may include account registration information such as a business name and a business email address comprising a domain name) (Step 100). Whether a public key certificate has been issued for the domain name may then be determined (Step 800). A public key certificate is an electronic document that may use a digital signature to bind together a public key with an entity (e.g., an individual, business, governmental entity, etc.). The certificate may be used to verify that a public key belongs to that entity. When issued to a website resolving from a domain name, it may serve to verify that the domain name is under that entity's control.

As a non-limiting example, the public key certificate may comprise any digital certificate using the public key infrastructure, such as a Secure Sockets Layer (SSL) or Transport Layer Security (TLS) certificate. SSL includes a protocol for transmitting private documents via the Internet by using a private key to encrypt data transferred over an SSL connection. An SSL certificate lets users know that the website owner/operator has been verified by a trusted third party (a Certificate Authority) and that confidential communications with the website are encrypted. The SSL certificate typically includes an identification of the server (such as its hostname), the server's public key, a digital signature provided by the Certificate Authority, the subject domain name, and the individual or business to which the certificate has been issued. Common conventional browsers, such as INTERNET EXPLORER or MOZILLA FIREFOX, support the SSL protocol, and many websites use the protocol to obtain confidential user information from their Customers. By convention, Uniform Resource Locators (URLs) that require an SSL connection start with "https:" instead of "http:."

Step 800 (determining whether a public key certificate has been issued for the domain name) may be accomplished by, as a non-limiting example, directly querying the hosting provider hosting the social website resolving from the domain name to determine whether an SSL certificate has been issued for the domain name. Alternatively, the domain name may be entered in a browser address bar subsequent to "https://." If the domain name resolves to a website, it has been issued an SSL certificate. If an SSL certificate has been issued, the certificate may be analyzed to determine whether it identifies the business name received in Step 100 (Step 810). This step may be accomplished by parsing the SSL certificate into data fields and extracting the business name and/or other relevant information, such as the domain name. If the SSL certificate properly identifies both the business name and the domain name, the relationship between the business name and domain name may thereby be positively established.

Figure 9:
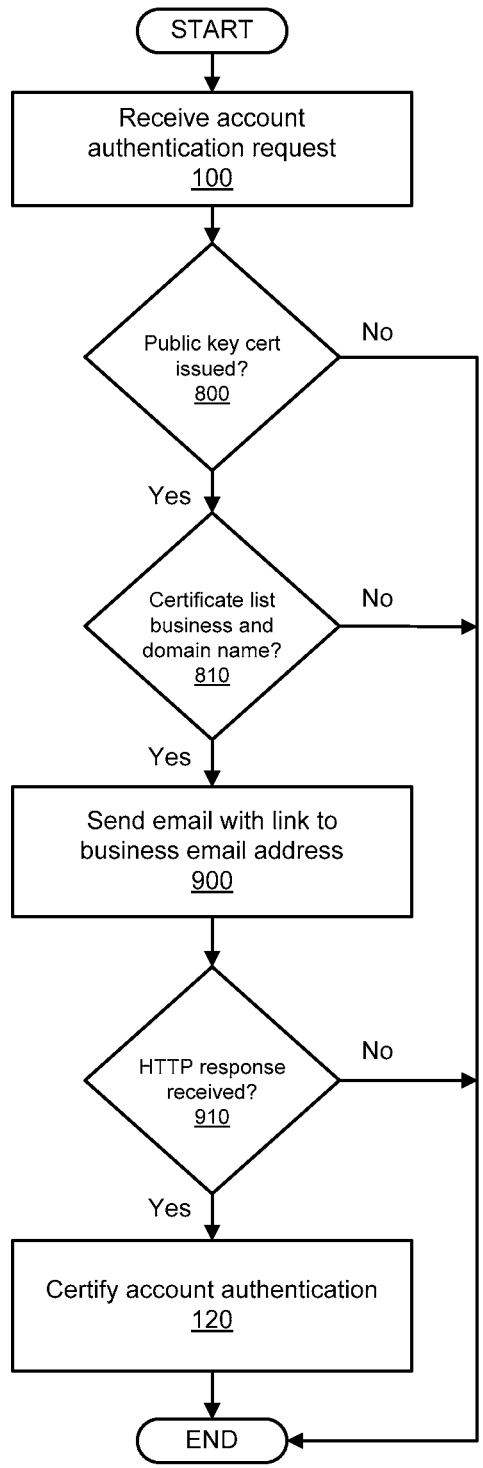
FIG. 9 is a flow diagram illustrating a possible embodiment of a public key certificate based social website account authentication method.

The illustrated method may further comprise the step of determining whether the business email address is under the control of the business (Step 820). As illustrated in FIG. 9, this step may be accomplished (as a non-limiting example) by sending an email message, perhaps containing a hyperlink, to the business email address (Step 900) and receiving an HTTP request that may originate from the hyperlink (Step 900). If a response is received, control of the email account by the business is established. The authenticity of the social website account may then be certified (Step 120) as described in detail above.

Figure 10:
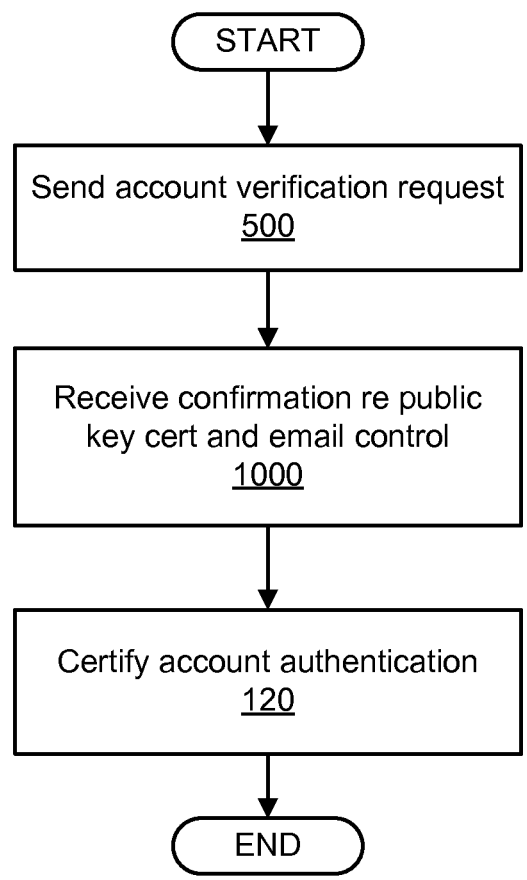
FIG. 10 is a flow diagram illustrating a possible embodiment of a public key certificate based social website account authentication method.

FIG. 10 illustrates another embodiment of a public key certificate based social website account authentication method that may comprise the step of sending (perhaps by at least one server computer communicatively coupled to a network) a request to verify the authenticity of a social website account (the request may include account registration information such as a business name and a business email address comprising a domain name) (Step 500). In response to the request, confirmation may be received that: (1) the domain name and/or business name are listed in a public key certificate issued for the domain name; and (2) the email address is under the control of the business name received in the request (Step 1000). The confirmations may be obtained via any of the methods discussed in detail above with regard to FIGS. 8 and 9. The authenticity of the social website account may then be certified (Step 120) as described in detail above.

Business Validation Based Social Website Account Authentication Methods

Figure 11:
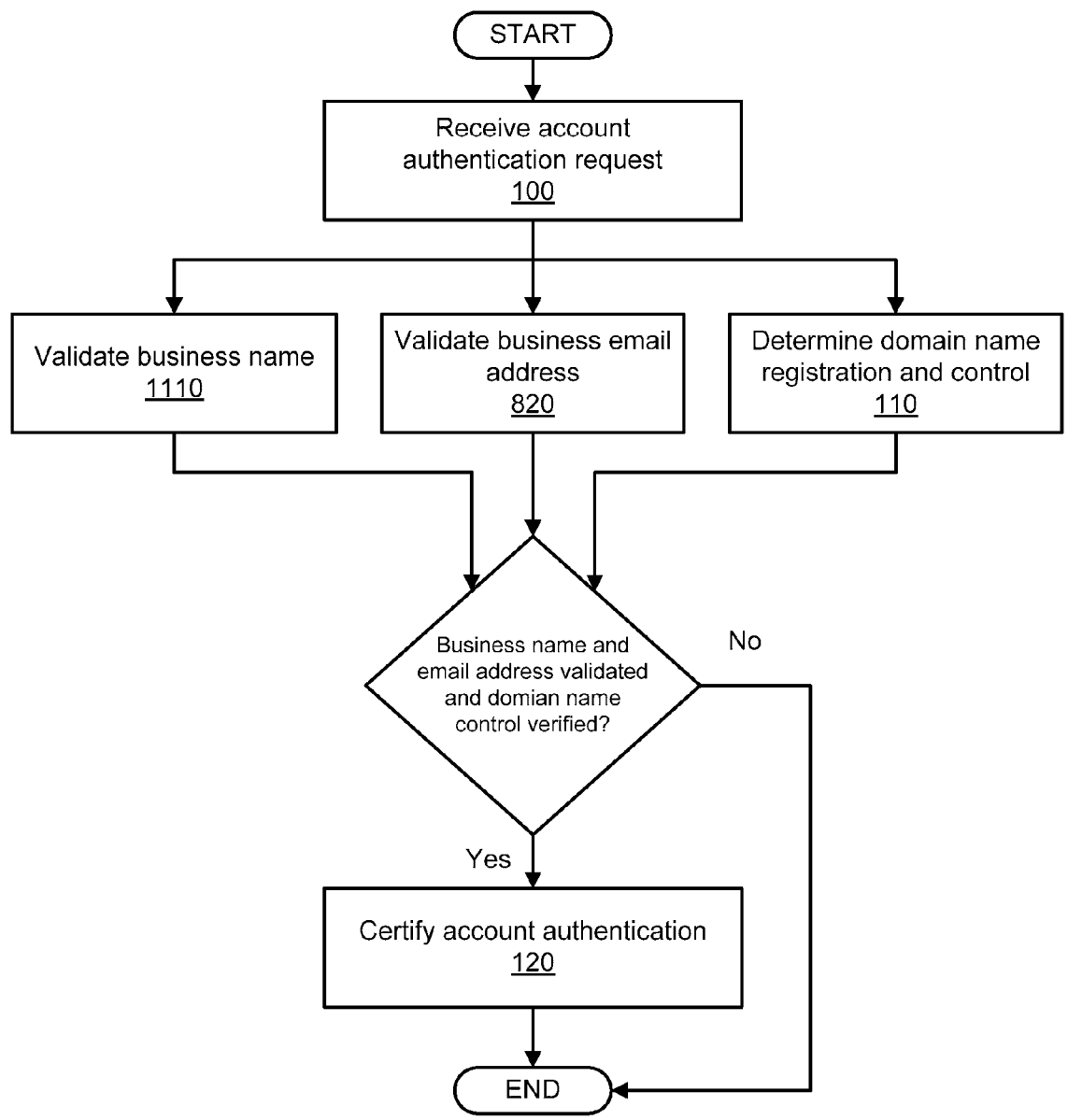
FIG. 11 is a flow diagram illustrating a possible embodiment of a business validation based social website account authentication method.

FIG. 11 illustrates a business validation based social website account authentication method that may comprise the step of receiving a request to verify the authenticity of a social website account (the request may include account registration information such as a business name and a business email address comprising a domain name) (Step 100). The validation request received in Step 100 may further comprise any additional information regarding the business and/or the individual that established the social website account including, but not limited to, employee name, a business address, and/or a business telephone number.

Following receipt of such a request, the social website account may be validated by validating the business (Step 1110), validating the business email address (Step 820), and determining whether the domain name is registered to and under control of the business (Step 110). These steps may be performed either in series or in parallel. Responsive to a determination that the business name and business email address are validated and that the domain name is registered to and under control of the business name, the authenticity of the social website account may be certified (Step 120). This method may provide a high-assurance guaranty that the social website account is authentic by combining the previously-described steps with a business validation element.

Figure 12:
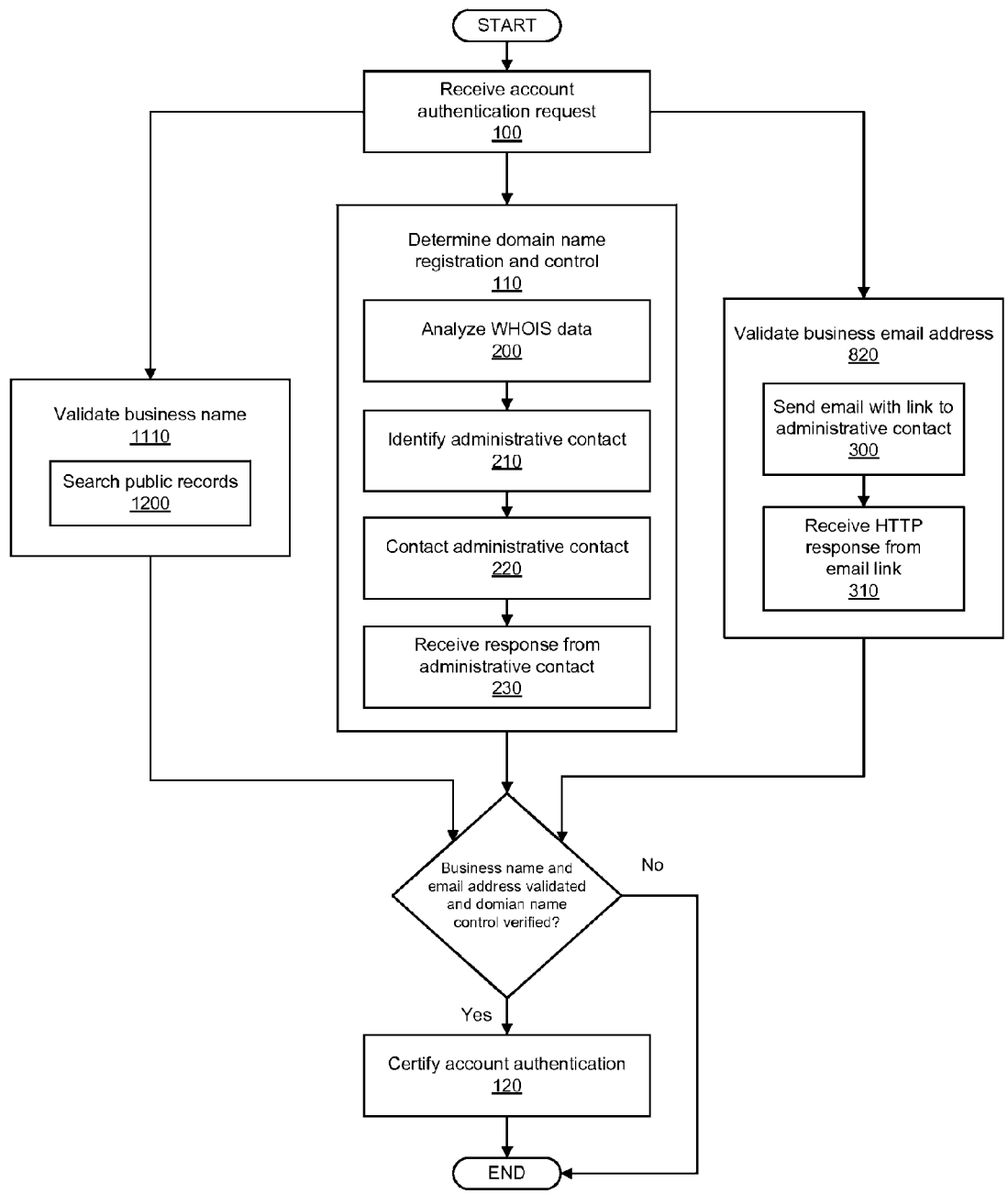
FIG. 12 is a flow diagram illustrating a possible embodiment of a business validation based social website account authentication method.

The business may be validated (Step 100) by any method known in the art or developed in the future of confirming that the business name provided in the request (Step 100) is a legal, existing business. As shown in FIG. 12 and as a non-limiting example, public business records (e.g., state corporation commission records, federal SEC records, business directories, and/or online phonebooks) may be searched to identify the business name (Step 1200). Alternatively, private databases (e.g., ZOOMINFO) may be accessed and searched. A positive result (i.e., an exact match of the provided business name in the directory) validates the business' existence. Business email address validation (Step 820), determination of domain name registration and/or control (Step 110), and social website account certification (Step 120) may be accomplished as described in detail above.

Figure 13:
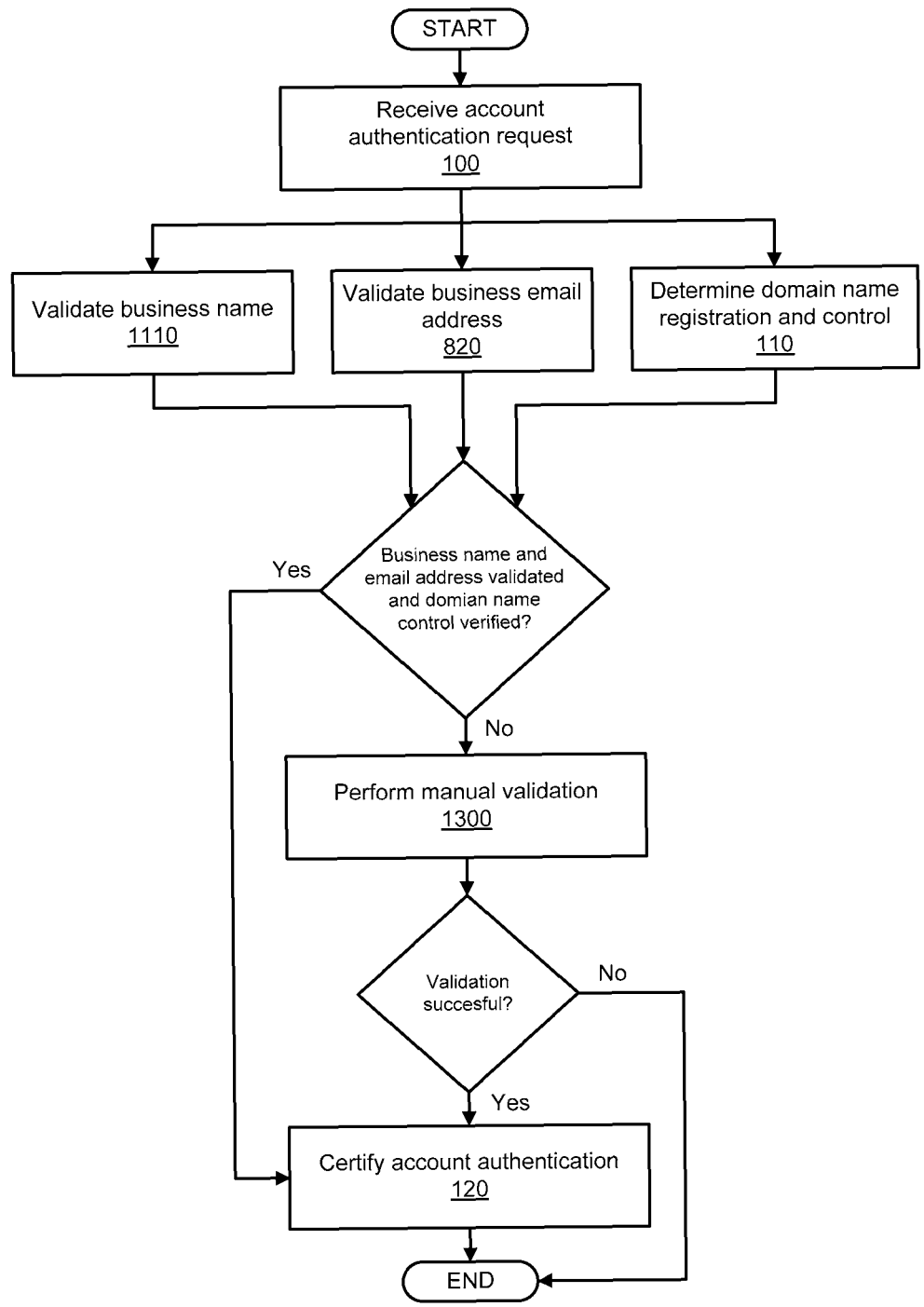
FIG. 13 is a flow diagram illustrating a possible embodiment of a business validation based social website account authentication method.

In the alternate embodiment illustrated in FIG. 13, responsive to a determination that the business name and/or business email address is not validated, or that the domain name is not registered to and under control of the business name, a manual business verification process may be performed (Step 1300). The manual verification process may comprise an individual searching (perhaps via a computer communicatively coupled to a network) public and/or private business records. It also may comprise calling a provided business telephone number to verify that the phone number is in fact related to the business and/or whether the employee who established the social website account is in fact employed by the business and/or authorized to establish a social website account on its behalf. Responsive to a positive result from said manual validation process, certifying, by said at least one server computer, the authenticity of the social website account may be certified (Step 120).

Figure 14:
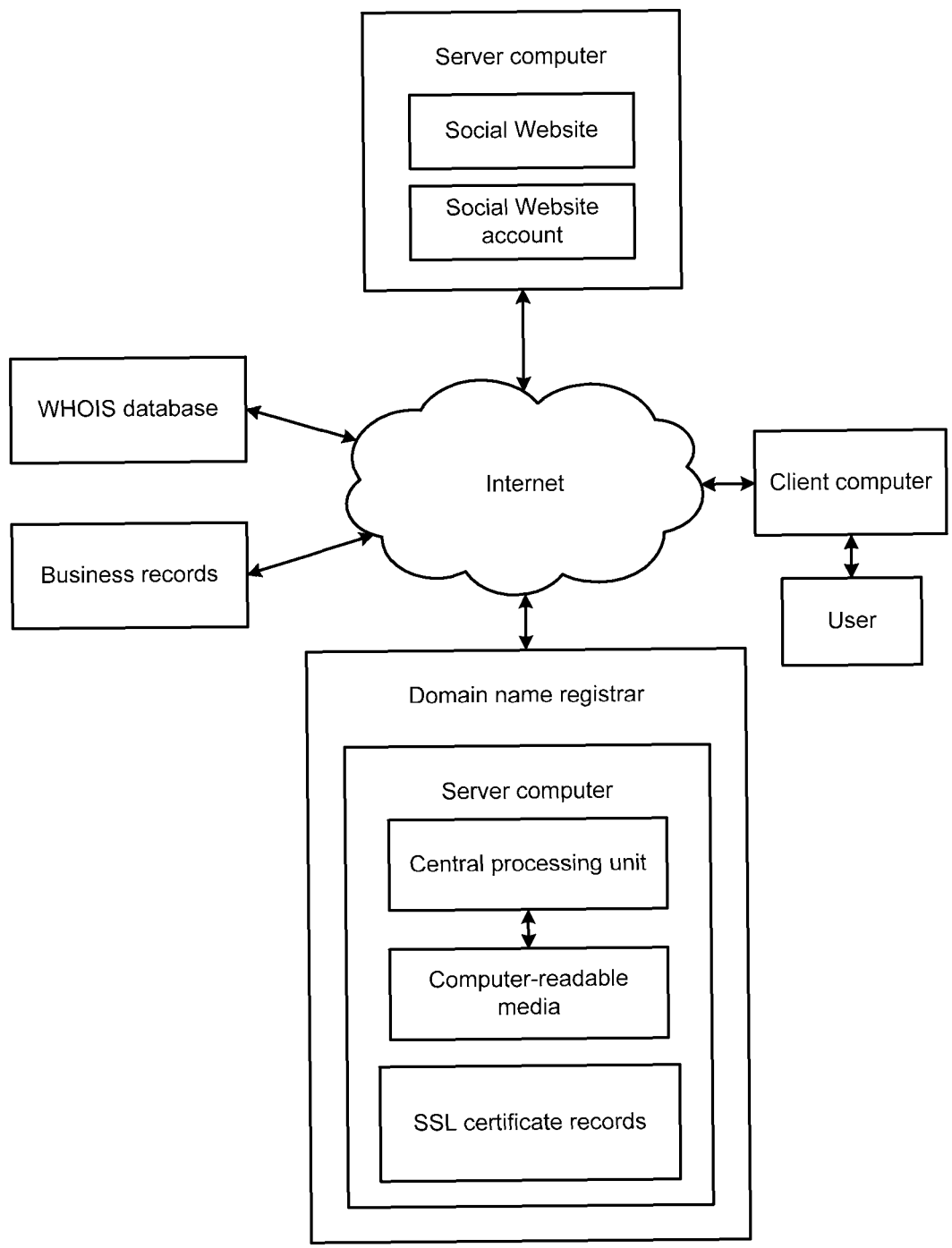
FIG. 14 is an illustration of a system that may be used for social website account authentication.

FIG. 14 is an illustration of a system that may be used for social website account authentication. As a non-limiting example, the method illustrated in FIG. 1 (and all steps of all methods described herein) may be performed by any central processing unit (CPU) in any computing system, such as a microprocessor running on at least one server, and executing instructions stored (perhaps as scripts and/or software) in computer-readable media accessible to the CPU, such as a hard disk drive on a server. The server(s) may be communicatively coupled to a network (such as the Internet) and at least one client that, collectively (along with the software described herein), may allow social website account authentication.

Such servers could comprise any computer or program that provides services to other computers, programs, or users either in the same computer or over a computer network. As non-limiting examples, servers may comprise application, communication, mail, database, proxy, fax, file, media, web, peer-to-peer, standalone, software, or hardware servers (i.e., server computers) and may use any server format known in the art or developed in the future (possibly a shared hosting server, a virtual dedicated hosting server, a dedicated hosting server, a cloud hosting solution, a grid hosting solution, or any combination thereof). Clients that may be used to connect to the network to use the illustrated embodiments may include a desktop computer, a laptop computer, a hand held computer, a terminal, a television, a television set top box, a cellular phone, a wireless phone, a wireless hand held device, an Internet access device, a rich client, thin client, or any other client functional with a client/server computing architecture.

The example embodiments herein place no limitation on network configuration or connectivity. Thus, as non-limiting examples, the network could comprise the Internet, the public switched telephone network, the global Telex network, computer networks (e.g., an intranet, an extranet, a local-area network, or a wide-area network), wired networks, wireless networks, or any combination thereof. Examples of clients that may be used may include a desktop computer, a laptop computer, a hand held computer, a terminal, a television, a television set top box, a cellular phone, a wireless phone, a wireless hand held device, an Internet access device, a rich client, thin client, or any other client functional with a client/server computing architecture.

Servers and clients may be communicatively coupled to the network via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPPoE), and/or any combination thereof.

Other embodiments and uses of the above inventions will be apparent to those having ordinary skill in the art upon consideration of the specification and practice of the inventions disclosed herein. The specification and examples given should be considered exemplary only, and it is contemplated that the appended claims will cover any other such embodiments or modifications as fall within the true scope of the inventions.

The Abstract accompanying this specification is provided to enable the United States Patent and Trademark Office and the public generally to determine quickly from a cursory inspection the nature and gist of the technical disclosure and in no way intended for defining, determining, or limiting any of its embodiments.

The inventions claimed are:

1. A method comprising the steps of:
   A) a domain name registrar receiving, by at least one server computer communicatively coupled to a network, a request from a social website to verify whether a social website account for said social website is non-fraudulent, said request comprising a business name for a business and a business email address for said business, said business email address comprising a domain name;
   B) said domain name registrar determining whether said domain name is registered to and under control of said business; and
   C) responsive to a determination that said domain name is registered to and under control of said business, said domain name registrar certifying to said social website that said social website account is non-fraudulent.

2. The method of claim 1, wherein said social website comprises a micro-blogging website.

3. The method of claim 1, wherein said social website comprises a software application selected from the group consisting of a micro-blogging application, a chat application, a forum application, a social networking application, a blog application, and an instant messaging application.

4. The method of claim 3, wherein said software application comprises a server-side software application.

5. The method of claim 3, wherein said software application comprises a client-side software application.

6. The method of claim 1, wherein said determining step B) comprises the steps of:
   i) analyzing a WHOIS data for said domain name;
   ii) identifying an administrative contact from said WHOIS data;
   iii) contacting said administrative contact; and
   iv) receiving confirmation from said administrative contact confirming that said domain name is registered to and under control of said business.

7. The method of claim 6, wherein said WHOIS data comprises an administrative contact email address.

8. The method of claim 7, wherein said contacting step iii) comprises sending an email message to said administrative contact email address.

9. The method of claim 8, wherein said administrative contact email message comprises a hyperlink.

10. The method of claim 9, wherein said receiving step iv) comprises receiving an HTTP request originating from said hyperlink.

11. The method of claim 1, wherein said determining step B) comprises sending an email message to said business email address, said email message comprising at least one instruction for verifying that said domain name is registered to and under control of said business.

12. The method of claim 11, wherein said email message comprises at least one instruction to modify a CNAME record for said domain name.

13. The method of claim 12, wherein said determining step B) further comprises determining that said CNAME record was modified according to said at least one instruction by analyzing a DNS record for said domain name.

14. The method of claim 11, wherein said email message comprises at least one instruction to upload an HTML file to a webpage resolving from said domain name.

15. The method of claim 14, wherein said email message further comprises said HTML file.

16. The method of claim 14, wherein said email message further comprises a file name for said HTML file.

17. The method of claim 14, wherein said determining step B) further comprises determining that said HTML file has been uploaded to said webpage.

18. The method of claim 14, wherein said confirmation is obtained by determining that said HTML file has been uploaded to said webpage.

19. The method of claim 1, wherein said certifying step C) comprises notifying said social website that said domain name is registered to and under control of said business.

20. The method of claim 1, wherein said certifying step C) comprises transmitting a certification seal to said social website.

21. The method of claim 1, wherein said certifying step C) comprises validating said social website account via said social website's application programming interface.

22. A method comprising the steps of:
   A) a social website sending, by at least one server computer communicatively coupled to a network, a request to a domain name registrar to verify whether a social website account for said social website is non-fraudulent, said request comprising a business name for a business and a business email address for said business, said business email address comprising a domain name;
   B) said social website receiving from said domain name registrar confirmation that said domain name is registered to and under control of said business; and
   C) said social website certifying on said social website that said social website account is non-fraudulent.

23. The method of claim 22, wherein said social website comprises a micro-blogging website.

24. The method of claim 22, wherein said social website comprises a software application selected from the group consisting of a micro-blogging application, a chat application, a forum application, a social networking application, a blog application, and an instant messaging application.

25. The method of claim 24, wherein said software application comprises a server-side software application.

26. The method of claim 22, wherein said confirmation is obtained by:
   i) analyzing a WHOIS data for said domain name;
   ii) identifying an administrative contact from said WHOIS data;
   iii) contacting said administrative contact; and
   iv) receiving confirmation from said administrative contact that said domain name is registered to and under control of said business.

27. The method of claim 26, wherein said WHOIS data comprises an administrative contact email address.

28. The method of claim 26, wherein said contacting step iii) comprises sending an email message to said administrative contact email address.

29. The method of claim 28, wherein said administrative contact email message comprises a hyperlink.

30. The method of claim 29, wherein said receiving step iv) comprises receiving an HTTP request originating from said hyperlink.

31. The method of claim 22, wherein said confirmation is obtained by sending an email message to said business email address, said email message comprising at least one instruction for verifying that said domain name is registered to and under control of said business.

32. The method of claim 31, wherein said email message comprises at least one instruction to modify a CNAME record for said domain name.

33. The method of claim 32, wherein said confirmation is obtained by determining that said CNAME record was modified according to said at least one instruction by analyzing a DNS record for said domain name.

34. The method of claim 31, wherein said email message comprises at least one instruction to upload an HTML file to a webpage resolving from said domain name.

35. The method of claim 34, wherein said email message further comprises said HTML file.

36. The method of claim 34, wherein said email message further comprises a file name for said HTML file.

37. The method of claim 22, wherein said certifying step C) comprises displaying an indicia of certification on said social website.

* * * * *